(12) United States Patent
Wittkopp

(10) Patent No.: US 7,654,170 B2
(45) Date of Patent: Feb. 2, 2010

(54) CENTERING SPRING APPARATUS FOR A TRANSMISSION SHIFT CONTROL MECHANISM

(75) Inventor: Scott H. Wittkopp, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 566 days.

(21) Appl. No.: 11/212,889

(22) Filed: Aug. 26, 2005

(65) Prior Publication Data

US 2007/0068324 A1   Mar. 29, 2007

(51) Int. Cl.
 *F16H 59/04* (2006.01)
(52) U.S. Cl. .................. 74/473.35; 74/473.1; 74/473.36
(58) Field of Classification Search ............... 74/473.1, 74/473.35, 473.36, 473.37, 523; 267/73, 267/74, 179, 286
 See application file for complete search history.

(56) References Cited

U.S. PATENT DOCUMENTS

| | | | | |
|---|---|---|---|---|
| 2,019,073 A * | 10/1935 | Cooper et al. | ............... | 192/53.3 |
| 2,077,578 A * | 4/1937 | Neracher | ................... | 74/473.3 |
| 3,648,537 A * | 3/1972 | Burrell | ................... | 74/473.24 |
| 3,866,488 A * | 2/1975 | Nakata et al. | ............ | 74/473.26 |
| 4,638,678 A * | 1/1987 | Gorman et al. | ........... | 74/473.22 |
| 4,912,997 A * | 4/1990 | Malcolm et al. | .............. | 74/335 |
| 5,272,931 A * | 12/1993 | Daniel | ........................ | 74/473.1 |
| 5,517,876 A * | 5/1996 | Genise et al. | ............ | 74/473.24 |
| 5,790,101 A * | 8/1998 | Schoch et al. | ................ | 345/161 |
| 6,666,104 B2 * | 12/2003 | Burger | ..................... | 74/473.36 |
| 6,820,515 B2 * | 11/2004 | Ikeya | ......................... | 74/473.3 |
| 7,011,197 B2 * | 3/2006 | Labout | ........................ | 192/3.63 |
| 7,458,311 B2 * | 12/2008 | Korthals | ...................... | 92/12.2 |

FOREIGN PATENT DOCUMENTS

DE        10163605         *   4/2003

* cited by examiner

*Primary Examiner*—Richard W L Ridley
*Assistant Examiner*—Matthew A Johnson

(57) ABSTRACT

A centering spring apparatus in a shift control mechanism includes a plurality of brackets providing stationary ground members for spring members and a shift control lever, which is operable to pick up the springs from the grounded portion to impose a centering force on the shift lever. These springs are disposed such that three different centering forces can be occasioned upon the shifting of the lever from one neutral position toward other neutral positions.

16 Claims, 5 Drawing Sheets

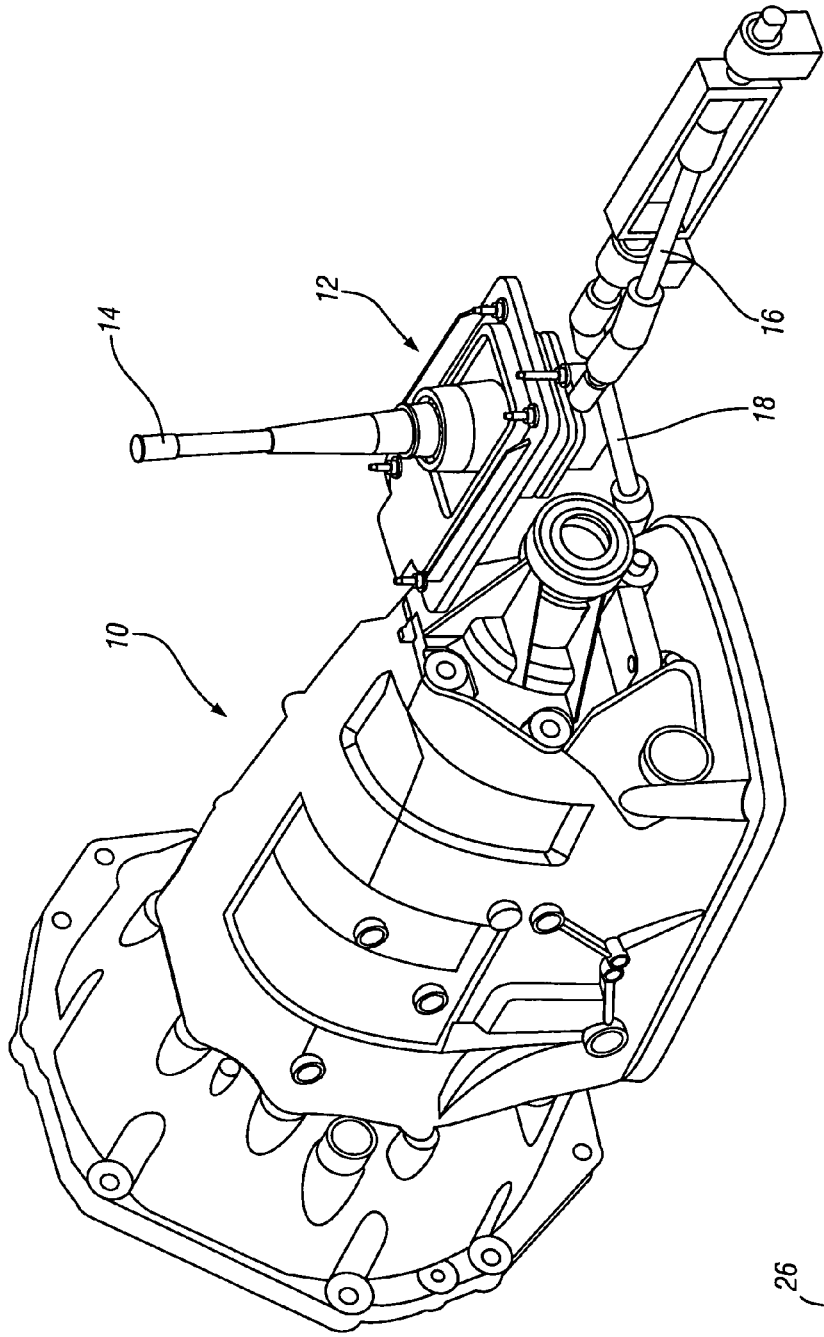
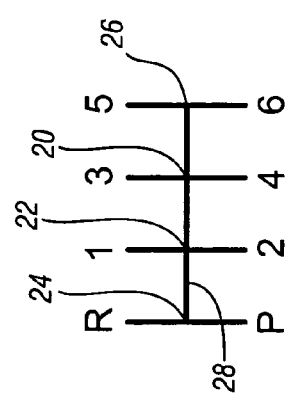
FIG. 1
FIG. 1A

CENTERING SPRING APPARATUS FOR A TRANSMISSION SHIFT CONTROL MECHANISM

TECHNICAL FIELD

This invention relates to shift control mechanisms and, more particularly, to centering spring apparatus in shift control mechanisms for mechanical-shifted transmissions.

BACKGROUND OF THE INVENTION

Power transmissions in motor vehicles have taken two distinct modes of operation. Automatic shifting transmissions generally include planetary gearsets and are controlled in ratio by hydraulic devices, which in turn are controlled by electro-hydraulic mechanisms. Countershaft transmissions, which include a plurality of intermeshing spur gears or helical gears, utilize mechanical or synchronizer clutches to control the torque and speed path through the transmission. The synchronizers are controlled by mechanical devices, which provide for lateral shifting of the synchronizers to cause engagement between an associated gear member and an associated shaft.

The shifting of the control synchronizers is accomplished by a plurality of shift forks, which in turn are controlled by mechanical shift mechanisms. With these types of shift mechanisms, it is desirable to have some centering apparatus, which will upon release of the shift mechanism in a neutral position cause the shift mechanism to return to a fixed location point.

More recently, synchronizer or mechanical clutches have been suggested for use with planetary-type transmissions. When used with planetary-type transmissions, synchronizers still require a mechanical shift mechanism, which will provide for the appropriate shifting or engagement of the synchronizers and also mechanisms to return the synchronizers to a neutral position when desired by the operator.

In the mechanical clutches or synchronizers that are employed with planetary transmissions, it is quite often necessary to provide for the simultaneous engagement of two synchronizers such that the proper torque path is established within the planetary gearsets.

SUMMARY OF THE INVENTION

It is an object of the present invention to provide an improved centering spring apparatus for a power transmission control mechanism.

In one aspect of the present invention, the control apparatus includes a lever mechanism manipulated by a manual input to provide for shifting of a plurality of shift yokes and a spring mechanism to return the lever to a central position when a neutral shift position is desired by the operator.

In another aspect of the present invention, one spring member is operable to return the shift lever from one of the shift positions to a neutral position.

In yet another aspect of the present invention, another spring is operable to return the shift lever to a neutral position from a second of the shift positions.

In still another aspect of the present invention, a third spring member is operable in combination with the second spring member to assist in returning the shift lever from a third shift position.

In a further aspect of the present invention, the third spring member also provides a detent feel for the operator before engaging or entering the third shift position.

DESCRIPTION OF THE DRAWINGS

FIG. 1 is an isometric view of a transmission and control mechanism employed with the present invention.

FIG. 1A is a diagrammatic view of a shift pattern.

DESCRIPTION OF AN EXEMPLARY EMBODIMENT

Figure 2:
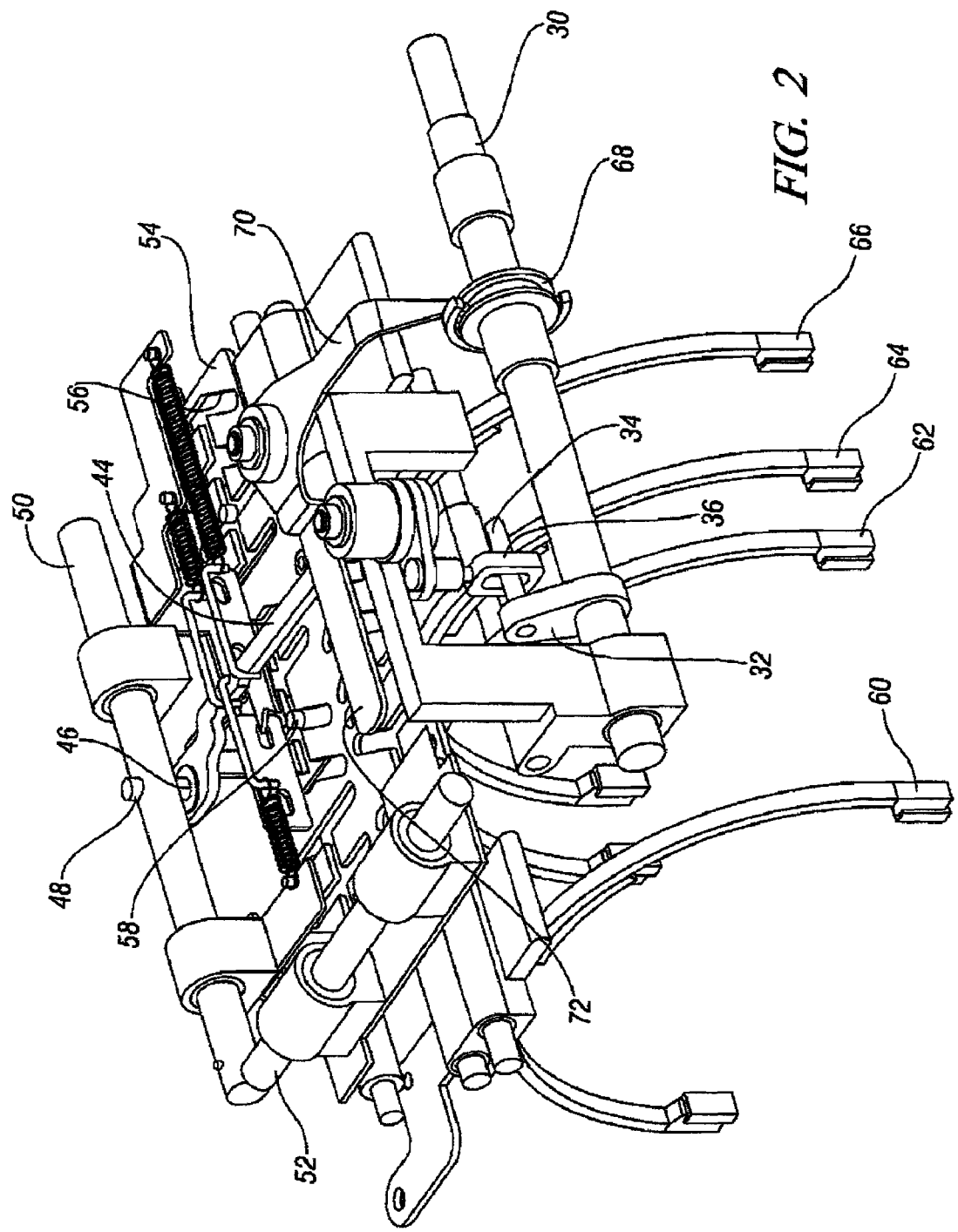
FIG. 2 is an isometric view of a portion of the transmission and control mechanism incorporating the present invention.

Referring to the drawings, wherein like characters represent the same or corresponding parts throughout the several views, there is seen in FIG. 1 a power transmission 10 having a shift control mechanism 12. The shift control mechanism 12 includes a manual shift lever 14, which is operable to manipulate a pair of control rods or cables 16 and 18.

The shift pattern traversed by the manual shift lever 14 is shown in FIG. 1A and includes a 3-4 neutral position 20, a 1-2 neutral position 22, a Reverse-Park neutral position 24, and a 5-6 neutral position 26. The general or spring set neutral position is 20 at the 3-4 intersection. This permits the driver or operator to know the position that the shifter will assume if moved to neutral and released. Thus, the driver or operator always knows the starting position from a pre-neutral so that the direction of the control can be determined.

When the shift control lever 14 is moved transversely along a line 28, the driver is selecting the neutral position 20, 22, 24, or 26, and when the shift lever 14 is moved longitudinally relative to the vehicle, the driver will select a first or second position, a third or fourth position, a fifth or sixth position, or a Reverse or Park position. If the operator moves the shift lever 14 from a neutral position, for example, neutral position 22, longitudinally of the vehicle, either the first gear or second gear is selected. If the operator moves the shift lever 14 longitudinally from the neutral position 20, either the third or fourth gear is selected. If the shift lever 14 is moved longitudinally from the neutral position 26, either the fifth or sixth gear is selected. If the operator moves the shift lever 14 transversely to the neutral position 24 and then longitudinally, either the Reverse or Park position is selected. This is commonly termed an "H" pattern of shifting, which is well known to those skilled in the art.

Figure 3:
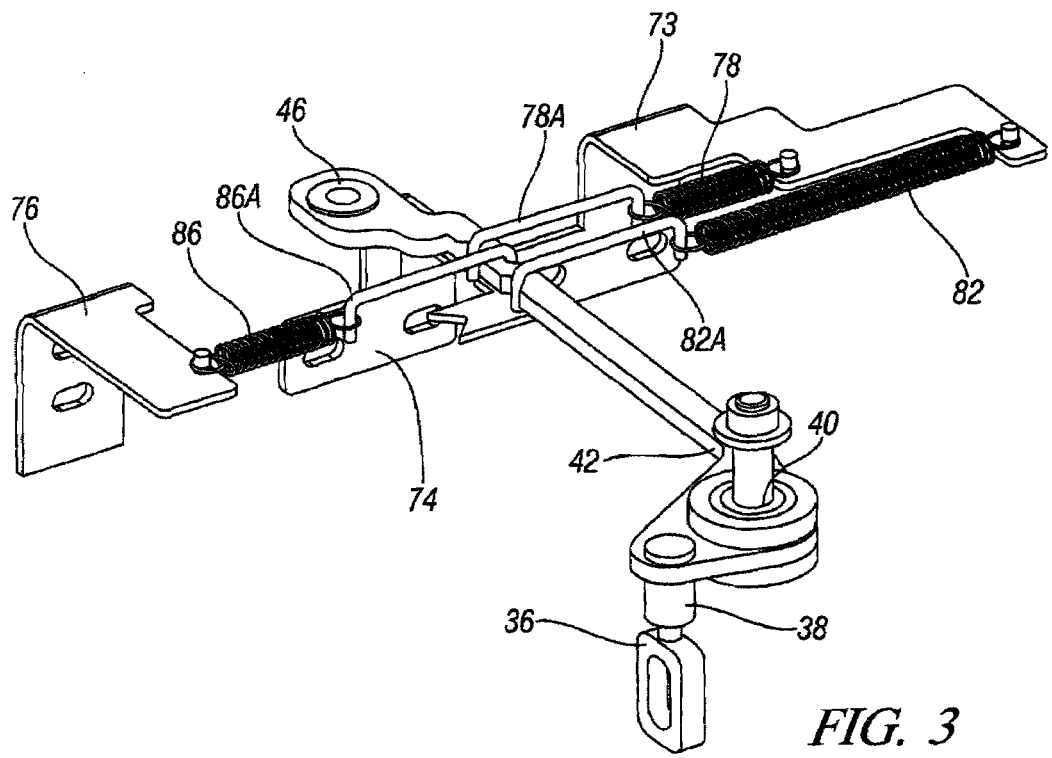
FIG. 3 is an isometric view of a spring return mechanism incorporating the present invention.

The shift control mechanism shown in FIG. 2 includes a control rod 30, which is connectible with the cable or rod 18. Thus, the rod 30 can be manipulated in a rotary direction when the shift mechanism is moved transversely and will translate when the shift control mechanism is moved longitudinally in the vehicle. The control rod 30 has attached thereto a yoke or lever 32, which includes a pin member 34 disposed in a slotted control member 36. The slotted control member 36, as seen best in FIG. 3, is attached to a control arm 38, which is pivotably mounted about a point 40. The control arm 38 also has an output arm 42, which is attached to a control lever 44 having an end bearing 46.

The end bearing 46, as seen in FIG. 2, is attached to a pin 48 through a rod 50. The rod 50 is connected with a transverse rod 52, which in turn is connected with a cam plate 54. The cam plate 54 has a plurality of slots, such as 56, formed therein, which engage control pins, such as 58. The control pins 58 are movable within the slots 56 to control the movement of shift forks 60, 62, 64, and 66. The shift forks 60, 62, 64, and 66 engage in conventional shift collars of a synchronizer. The mechanism between the shift forks and the shift collar is well known to those skilled in the art.

The shift rod 30 also has a control collar 68 secured thereto. The control collar 68 is operatively connected with a transverse lever 70, which has an output arm 72, which is adapted to move the cam plate 54 transverse within the shift control mechanism. The lever 70 will control the positioning of the cam plate 54 along the neutral track and the lever 44 will control the positioning of the cam plate 54 in the transverse position to the various gear selections for the transmission.

Figure 4:
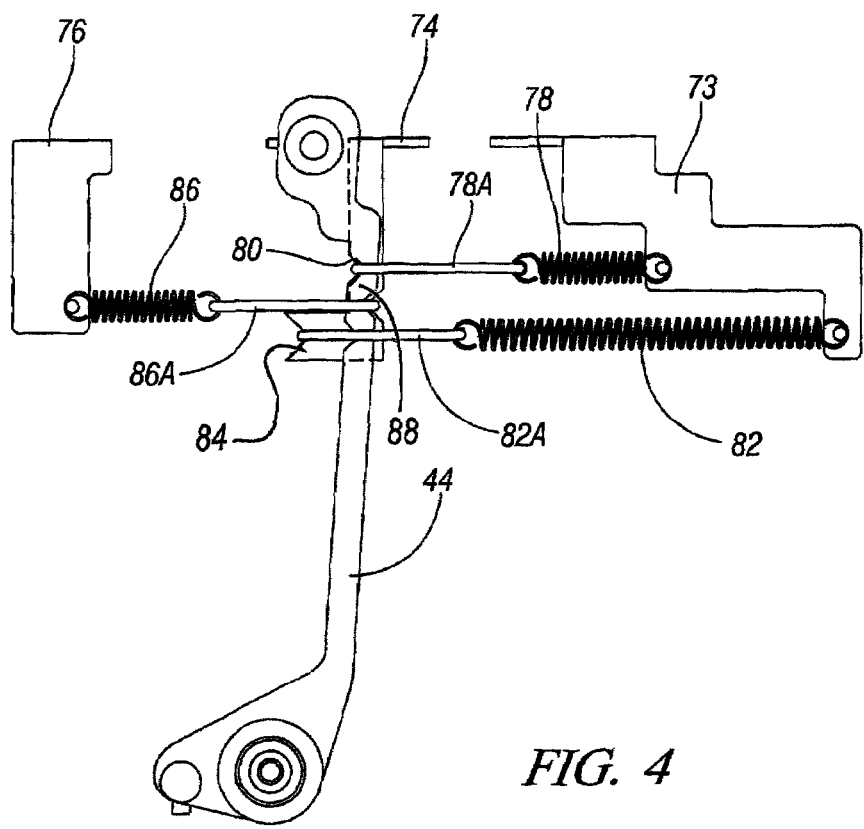
FIG. 4 is a plan view of the mechanism shown in FIG. 3 with the mechanism disposed in a neutral position.
Figure 5:
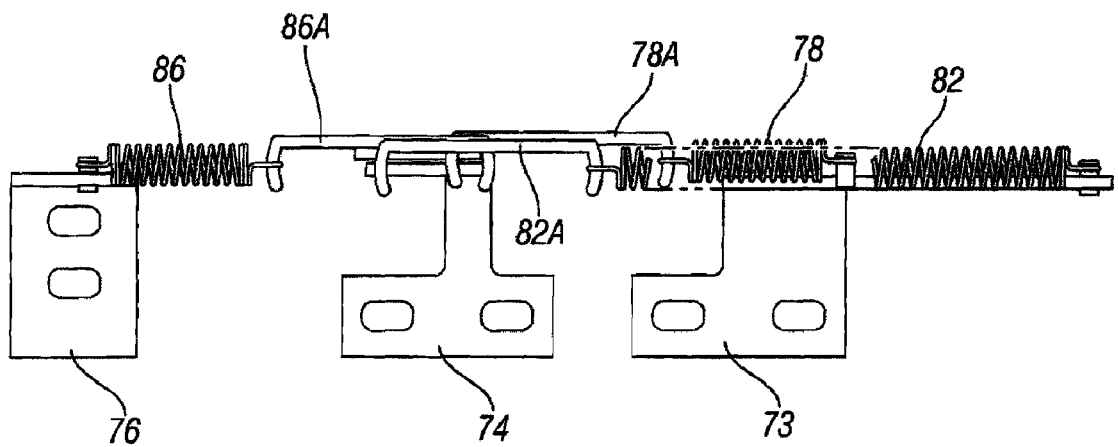
FIG. 5 is a side view of the mechanism shown in FIG. 4.

The lever 44 has associated therewith a plurality of brackets 73, 74, and 76, which are attached to a stationary member, such as a transmission housing. The bracket 73 supports a spring 78 and spring extension 78A, which is provided in tension between the bracket 73 and a notch 80 formed in the lever 44 as seen in FIGS. 4 and 5. The bracket 73 also controls one end of a spring 82 and a spring extension 82A, which is disposed in tension between the bracket 73 and a notch 84 formed on the bracket 74. The bracket 76 supports one end of a spring 86 and a spring extension 86A, which is maintained in tension between the bracket 76 and a notch 88 formed in the lever 44. The bracket 74 has notches 90 and 92, which align with the notches 80 and 88 when the lever 44 is in the neutral position shown in FIG. 4.

Figure 7:
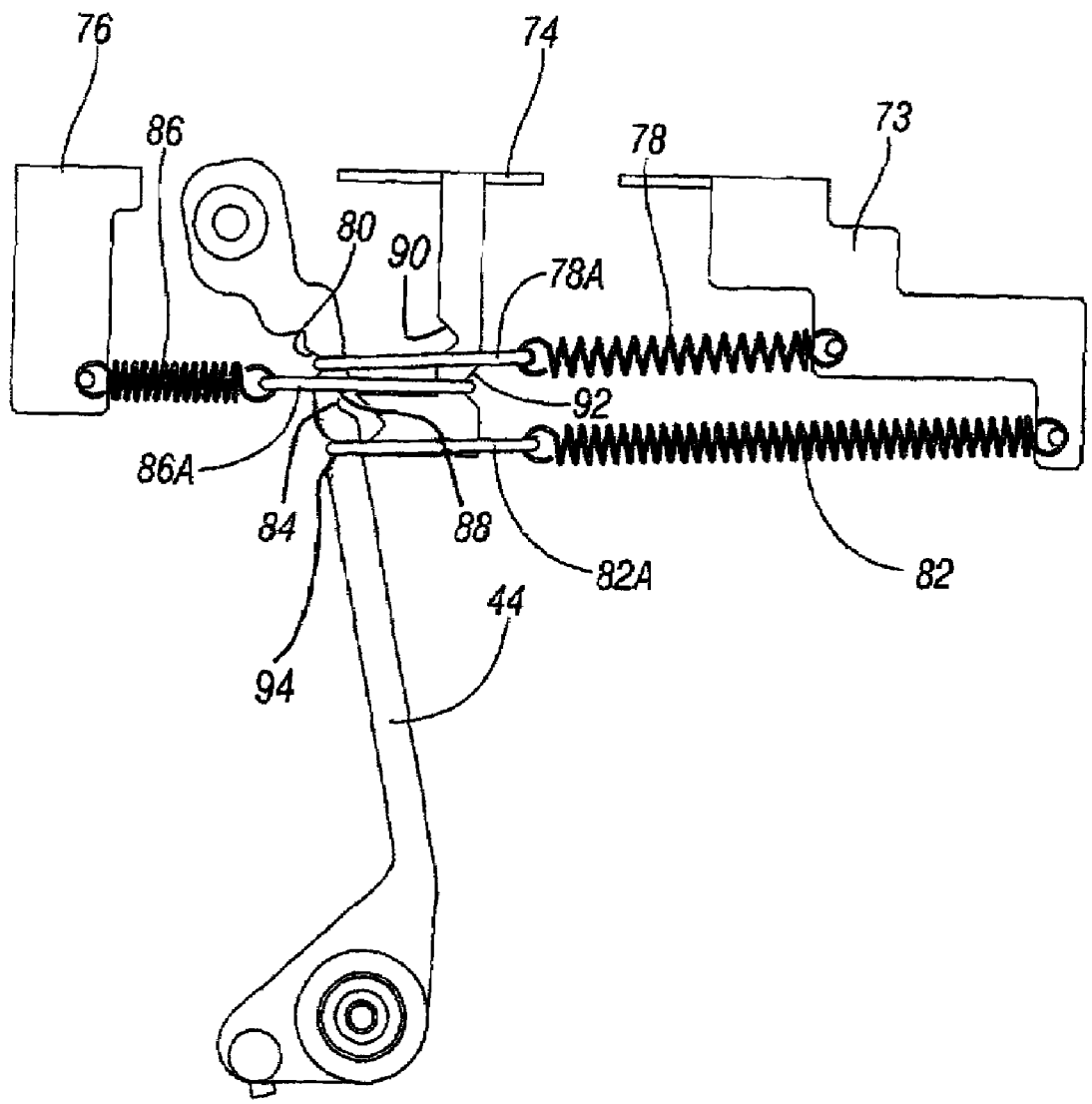
FIG. 7 is a view similar to FIG. 4 showing the shift mechanism in another of the shift positions.

As mentioned with FIG. 1A, the neutral position is disposed at 20 in the 3-4 shift gate. Lever 44 has yet another notch 94 as seen in FIG. 7. If the shift control mechanism is moved from the neutral position 20 to the neutral position 26, as shown in FIGS. 1 and 4, the spring 86 will be placed in more tension between the bracket 76 and the notch 88. This will impose a return or centering force on the lever 44.

Figure 6:
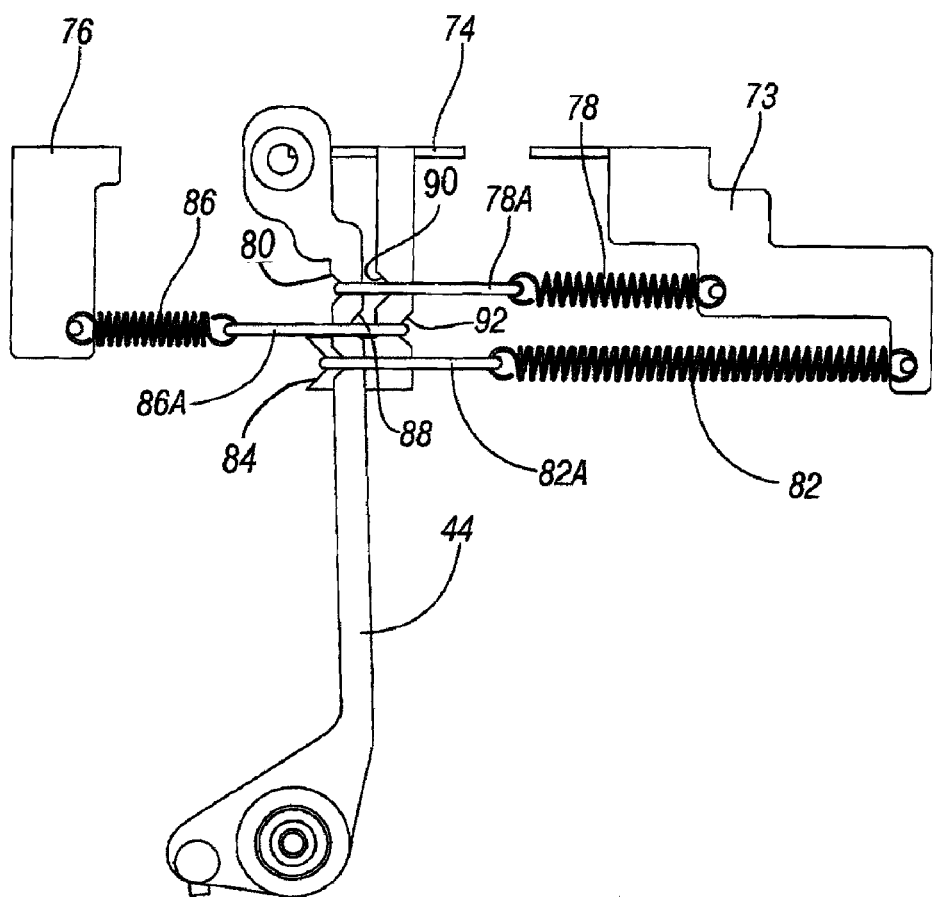
FIG. 6 is a view similar to FIG. 4 showing the shift mechanism in one of the shift positions.

When the shift lever 44 is moved from the neutral position 20 to the neutral position 22, the tension force in spring 78 will be increased thereby increasing the centering force on the lever 44 as seen in FIG. 6. Further movement of the lever 44 along the neutral track through the neutral position 24 will permit the spring 82 to engage in the notch 94, thereby increasing the centering force imposed on the lever 44 as seen in FIG. 7. Also, it is noted that the spring 78 continues to have a centering effect on the lever 44.

Between the position shown in FIG. 6 and FIG. 7, when the lever 44 initially engages the notch 94 with the spring 82, the operator will be aware of an increase in the return force on the shift lever 14 and will know that the Reverse-Park position is being selected. This provides the driver with a mechanism such that the Reverse-Park position cannot be inadvertently selected when seeking the 1-2 position. The lever 44 has a maximum centering force when in the position 24 to return the mechanism to the position 20. However, upon reaching the position 22, a portion of the return force provided by spring 82 is eliminated such that only the spring 78 imposes a return force on the lever 44 from the 1-2 neutral position 22 to the 3-4 neutral position 20.

It will now be apparent that the centering spring mechanism will provide one return force from the 5-6 neutral position to the 3-4 neutral position; a second return spring force from the 1-2 neutral position to the 3-4 neutral position and a two step return force from the Reverse-Park neutral position to the 3-4 neutral position. A high force from the reverse-park neutral (both springs 78 and 82) to the 1-2 neutral position, and a lesser force (spring 78) to the 3-4 neutral position. Also, it should be noted that at least a portion of the return spring apparatus provides a detent feel for the operator when moving from the 1-2 neutral position to the Reverse-Park neutral position.

The invention claimed is:

1. A return spring apparatus and a shift control mechanism comprising:

a pivotably mounted shift lever;

a plurality of brackets immovably fixed to a stationary portion of said control mechanism;

first spring means having a first end and a second end, wherein said first end is fixed to a first of said brackets and said second end is partially engaged to a second of said brackets and said first spring means is aligned with first notch means formed in said shift lever;

second spring means having a first end and a second end, wherein said first end is partially engaged to said second of said brackets and said second end is fixed to a third of said brackets and said second spring means is aligned with second notch means formed in said shift lever;

said second end of said first spring means being operable to at least partially engage said shift lever on movement in one direction from a neutral position to impose a first centering force on said shift lever;

said first end of said second spring means being operable to impose a second centering force on said shift lever upon movement in an opposite direction from the neutral position.

2. The return spring apparatus and a shift control mechanism as defined in claim 1 further wherein:

said first spring means further providing a detent feel upon movement of said shift lever from the neutral position in a first direction after engagement of a portion of said first spring means and said first spring means enforcing a further centering force on said shift lever upon extended movement of said shift lever away from said first neutral position.

3. A return spring apparatus and a shift control mechanism comprising:

a pivotally mounted shift lever moveable to a first neutral position, a second neutral position, and a third neutral position;

a plurality of brackets immovably fixed to a stationary portion of said control mechanism, first spring means having a first end and a second end, wherein said first end is fixed to a first of said brackets and said second end is partially engaged to a second of said brackets and said first spring means being aligned with a first notch formed in said shift lever;

second spring means having a first end and a second end, wherein said first end is partially engaged to said second of said brackets and said second end is fixed to a third of said brackets and said second spring means being aligned with a second notch formed in said shift lever;

third spring means having a first end and a second end, wherein said first end is fixed to said first of said brackets and said second end is partially engaged to said second of said brackets and said third spring means being aligned with a third notch formed in said shift lever; and said first spring means imposing a first centering force on said shift lever during movement from said first neutral position in a first direction toward said second neutral position, said second spring means imposing a second centering force on said shift lever during movement from said first neutral position toward said third neutral position, and both said first and third spring means imposing a third centering force on said shift lever during movement in said first direction away from said second neutral position.

4. The return spring apparatus and shift control mechanism as defined in claim 1 further comprising:
a third spring means having a first end and a second end, wherein said first end is fixed to said first of said brackets and said second end is partially engaged to said second of said brackets and said third spring means is aligned with first notch means formed in said shift lever.

5. The return spring apparatus and shift control mechanism as defined in claim 1 wherein:
a spring set neutral position is at a third gear/fourth gear neutral position.

6. The return spring apparatus and shift control mechanism as defined in claim 5 further wherein:
the first spring means engages the first notch means of the shift lever when the shift lever moves from the third gear/fourth gear neutral position to a first gear/second gear neutral position.

7. The return spring apparatus and shift control mechanism as defined in claim 5 further wherein:
the second spring means engages the second notch means of the shift lever when the shift lever moves from the third gear/fourth gear neutral position to a fifth gear/sixth gear neutral position.

8. The return spring apparatus and shift control mechanism as defined in claim 5 further wherein:
the first spring means engages the first notch means of the shift lever when the shift lever moves from the third gear/fourth gear neutral position to a park/reverse neutral position.

9. A return spring apparatus and a shift control mechanism comprising:
a control lever pivotably mounted to a stationary member of the shift control mechanism;
a first bracket, a second bracket, and a center bracket each immovably fixed to the stationary member;
a first spring means having a first end and a second end, wherein the first end is fixed to the first bracket and the second end is partially engaged to the center bracket and the first spring means is aligned with a first notch formed in the control lever;
a second spring means having a first end and a second end, wherein the first end is fixed to the second bracket and the second end is partially engaged to the center bracket and the second spring means is aligned with a second notch formed in the control lever;
wherein the first spring means are operable to at least partially engage the control lever on movement in a first direction from a neutral position to impose a first centering force on the control lever and the second spring means are operable to impose a second centering force on the control lever upon movement in a second direction from the neutral position.

10. The return spring apparatus and a shift control mechanism as defined in claim 9 further comprising:
a third spring means having a first end and a second end, wherein the first end is fixed to the first bracket and the second end is partially engaged to the center bracket and said third means is aligned with a third notch formed in the control lever; and
wherein the third spring means are operable to at least partially engage the control lever on movement in the first direction from a neutral position to impose a third centering force control lever.

11. A transmission shift control mechanism comprising:
a stationary bracket;
a shift control lever;
a slotted control member;
a first control rod movably connected to the shift control lever, the first control rod having a yoke member extended through the slotted control member;
a control arm rotatably connected to the slotted control member and pivotably mounted to the stationary bracket, the control arm having a first, a second, and a third notch and an end bearing;
a second control rod slidably mounted to the stationary bracket, the second control rod pivotably connected to the end bearing of the control arm;
a first bracket immovably fixed to the stationary bracket and having a first notch aligned with the first notch of the control arm, a second notch aligned with the second notch of the control arm, and a third notch aligned with the third notch of the control arm;
a second bracket immovably fixed to the stationary bracket and having a first pin aligned with the first notch of the first bracket and a second pin aligned with the third notch of the first bracket;
a third bracket immovably fixed to the stationary bracket and having a pin aligned with the second notch of the first bracket;
a first spring means having a first end retained by the first notch of the first bracket and a second end retained by the first pin of the second bracket;
a second spring means having a first end retained by the second notch of the first bracket and a second end retained by the pin of the third bracket; and
a third spring means having a first end retained by the third notch of the first bracket and a second end retained by the second pin of the second bracket.

12. The transmission shift control mechanism of claim 11 wherein the control arm is disposed in a first position having the first spring means engaged with the first notch of the control arm.

13. The transmission shift control mechanism of claim 11 wherein the control arm is disposed in a second position having the first spring means engaged with the first notch of the control arm and the third spring means engaged with the third notch of the control arm.

14. The transmission shift control mechanism of claim 11 wherein the control arm is disposed in a third position having the second spring means engaged with the second notch of the control arm.

15. The transmission shift control mechanism of claim 11 wherein the stationary bracket is a transmission housing.

16. The transmission shift control mechanism of claim 11 further comprising:
a cam plate; and
a transverse control rod mounted to the cam plate, the transverse control rod having an end connected to the second control rod.

* * * * *